(12) United States Patent
Felon et al.

(10) Patent No.: US 8,028,079 B2
(45) Date of Patent: Sep. 27, 2011

(54) EFFICIENT TRANSFORM FROM XML TO JAVASCRIPT OBJECTS

(75) Inventors: Adrien Felon, Seattle, WA (US); Danny Lange, Sammamish, WA (US); Joseph Futty, Sammamish, WA (US); Ashley N Feniello, Woodinville, WA (US); Graham A Wheeler, Redmond, WA (US); Didier Coussemaeker, Seattle, WA (US); Nicolas Mai, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 12/484,964

(22) Filed: Jun. 15, 2009

(65) Prior Publication Data

US 2010/0318683 A1     Dec. 16, 2010

(51) Int. Cl.
*G06F 15/16*     (2006.01)
(52) U.S. Cl. ......... 709/230; 709/246; 709/231; 709/203
(58) Field of Classification Search .................. 709/230, 709/231, 204, 238, 246, 206–207, 203, 217, 709/219
See application file for complete search history.

(56) References Cited

U.S. PATENT DOCUMENTS

| 7,463,648 | B1 | 12/2008 | Eppstein et al. | |
| 7,480,894 | B2 | 1/2009 | Hasson et al. | |
| 7,500,017 | B2 * | 3/2009 | Cseri et al. | 709/246 |
| 2007/0266176 | A1 | 11/2007 | Wu | |
| 2008/0172496 | A1 * | 7/2008 | Middleton et al. | 709/246 |
| 2008/0275938 | A1 | 11/2008 | Yach | |
| 2009/0006454 | A1 | 1/2009 | Zarzar et al. | |
| 2009/0013310 | A1 | 1/2009 | Arner et al. | |
| 2009/0029687 | A1 | 1/2009 | Ramer et al. | |
| 2009/0083321 | A1 | 3/2009 | Adams et al. | |
| 2009/0307229 | A1 * | 12/2009 | Kunti et al. | 707/10 |

OTHER PUBLICATIONS

Martin et al., "WAP Binary XML Content Format", Jun. 1999, W3C, www.w3.org/TR/wbxml/.*
Arora. et al., "Mobile Ajax for Java ME Technology", retrieved on Apr. 15, 2009 at <<http://www.w3.org/2007/06/mobile-ajax/papers/sun.hardy.mobileAjaxJavaME.pdf, 5 pages.
"Java Ajax Frameworks", retrieved on Apr. 15, 0009 at http://ajaxpatterns.org/Java__Ajax__Frameworks>>, pp. 1-17.
McCarthy, "Ajax for Java developers: Java object serialization for Ajax", retrieved on Apr. 15, 2009 at http://www.ibm.com/developerworks/library/j-ajax2/>>, pp. 1-13.
"Server-Side Code Generation", retrieved on Apr. 15, 2009 at http://ajaxpatterns.org/Server-Side__Code__Generation>>, 8 pages.
"Structure Mapping between XML and Java", retrieved on Apr. 15, 2009 at <<http://jibx.sourceforge.net/tutorial/binding-structures.html>>, 4 pages.

* cited by examiner

*Primary Examiner* — Wing Chan
*Assistant Examiner* — Ruolei Zong
(74) *Attorney, Agent, or Firm* — Lee & Hayes, PLLC

(57) ABSTRACT

This disclosure describes data conversion and techniques for sending and receiving data at a mobile device. In one implementation, a proxy server may receive data from a mobile device. The proxy server may convert the data and send the converted data to a network service. In another implementation, a mobile device may convert data and send that data to a network service. The network service may generate data in response and send that data to the mobile device directly.

9 Claims, 11 Drawing Sheets

EFFICIENT TRANSFORM FROM XML TO JAVASCRIPT OBJECTS

BACKGROUND

Today, mobile devices have become a part of everyday life. Use of mobile devices is growing rapidly not only domestically but in emerging markets as well. Many countries that lack sufficient land-line infrastructure are turning to mobile networks. Users in these countries are buying or leasing mobile devices as a primary means of Internet access. Whether it is a cellular phone, a smartphone, a Personal Digital Assistant (PDA), or the like, mobile users everywhere are increasingly using these mobile devices containing mobile applications as a means to access web applications Accessing web applications on a mobile device presents obstacles for both the mobile device user and the mobile device developer. For example, a conventional mobile application might operate using a scripting language such as Javascript, while network services characteristically respond to and with an Extensible Markup Language (XML), therefore making it difficult for the mobile device and the network services to communicate with one another. The different languages make it both time consuming and expensive for the mobile device to access the web applications to interact and/or utilize data received from the web applications.

Therefore, there is a need to improve the mobile devices ability to receive and send data to a network.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In view of the above, this disclosure describes various exemplary methods and computer-readable media for data conversion. This disclosure describes how a mobile device may send and receive data from a network service.

In one implementation, a proxy server may receive data from a mobile device. The proxy server may convert the data from a first language to a second language, send the inbound data to a network service, receive outbound data in response, and convert the outbound data back to the first language.

In another implementation, a mobile device may perform a first conversion, converting data from a scripting language to a binary format by mapping elements of the scripting language to elements of the binary format, and sending that data to a network service.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

As described above, this disclosure describes various exemplary methods and computer-readable media for data conversion. This disclosure describes how a mobile device may send and receive data from a network service.

In one implementation, a proxy server may receive data from a mobile device. The proxy server may convert the data from a first language to a second language, send the inbound data to a network service, receive outbound data in response, and convert the outbound data back to the first language.

In another implementation, a mobile device may perform a first conversion converting data from a scripting language to a binary format by mapping elements of the scripting language to elements of the binary format and sending that data to a network service.

The architecture for sending to and receiving from a network service is not limited to any particular application, but may be applied to many contexts and environments. The architecture may be employed to keep transport bandwidth usage to a minimum, preserve the structure of data, improve efficiency, and reduce air time usage for consumers.

Exemplary System for Mobile Device

Figure 1:
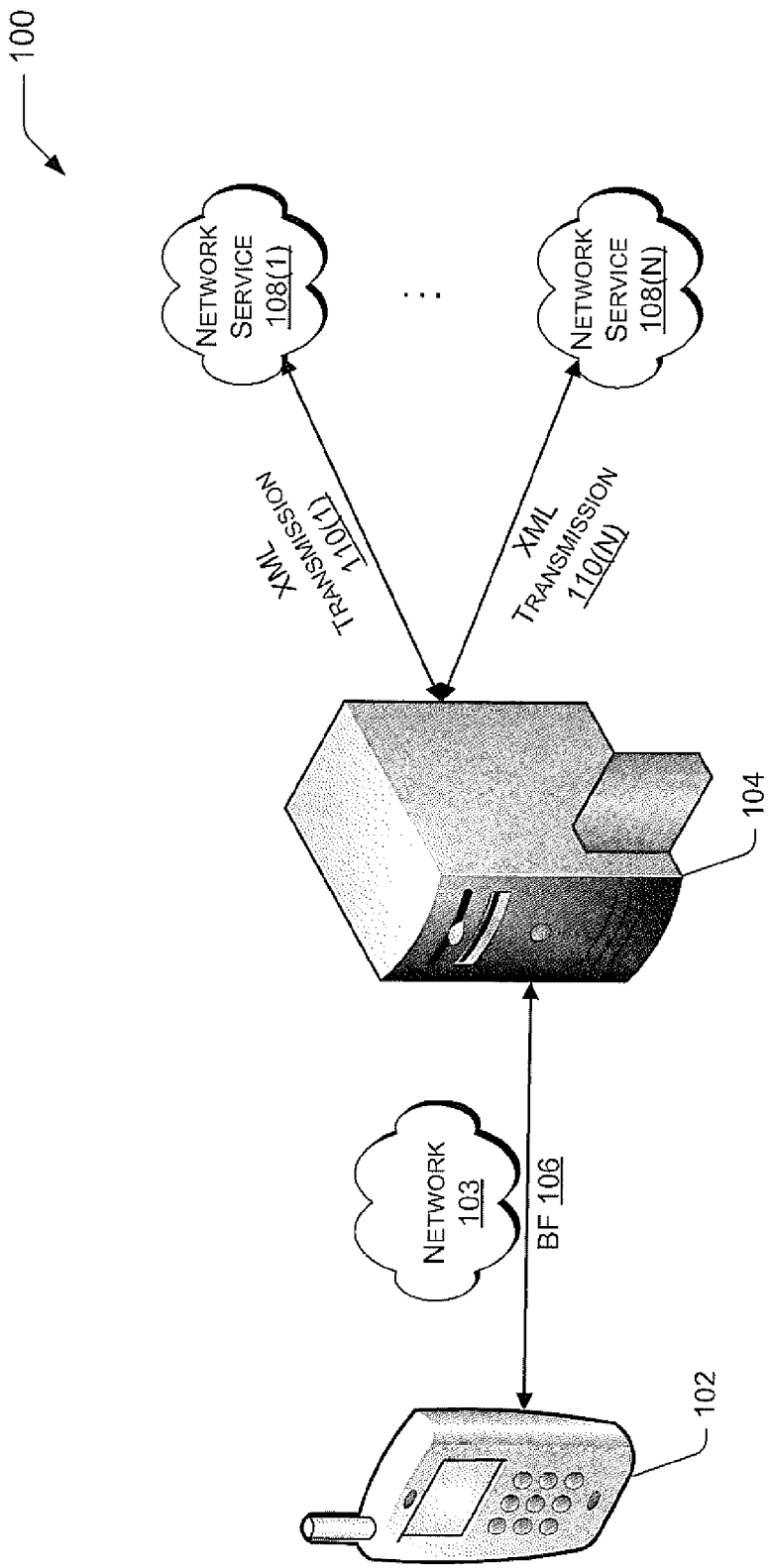
FIG. 1 is a schematic of an illustrative architecture of a mobile device accessing a web application.

FIG. 1 illustrates an exemplary system 100 for sending and receiving a data transmission on a mobile device. The system for sending and receiving a data transmission includes a mobile device 102, a network 103, a proxy server 104, a Binary Format (BF) 106, and network service(s) 108(1)-108(N). The mobile device 102 is shown as a smart phone. However, in other implementations the mobile device may be, without limitation, a server, a personal computer (PC), a portable computer, a television, a receiver, a wireless phone, a game console, combinations of any of these, and the like. A mobile device may be a computing device having wireless capabilities, a display screen and input means, such as a stylus or keyboard.

In one implementation, binary format (BF) 106 is shown as a data transmission or a payload communicated from the mobile device 102 to the proxy server 104. In one implementation, BF 106 is communicated to the proxy server 104 via a communication protocol such as Hypertext Transfer Protocol (HTTP). However, in other implementations other communication protocols may be used. BF 106 may include scripts that are executed by the mobile device 102, Java, C++, phone specific memory mapping, operator specific memory mapping, hardware specific memory mapping, images, notifications, documents, RSS feeds, and the like.

The network services 108(1)-108(N) are illustrated as the Internet, but may additionally or alternatively include a variety of other wide area networks (WANS), such as the intranet, a wired or wireless telephone network, a satellite network, a cable network, a digital subscriber line network, a broadcast, and so forth. The network services 108(1)-108(N) may include or be coupled to one or more types of system memory. System memory may be located at a host such as, a server, coupled to the network. By way of example, system memory may be located at a service provider of the content sources and/or a third party computing device.

The network services 108(1)-108(N) may communicate a data transmission to the mobile device 102 via a server proxy 104. In one implementation, the data transmission is an XML transmission 110(1)-110(N). The XML transmission may include substantially real-time content, non-real time content, or a combination of the two. Sources of substantially real-time content generally includes those sources for which content is changing over time, such as, for example, live television or radio, webcasts, or other transient content. Non-real time content sources generally include fixed media readily accessible by a consumer, such as, for example, pre-recorded video, audio, text, multimedia, games, or other fixed media readily accessible by a consumer.

Figure 2:
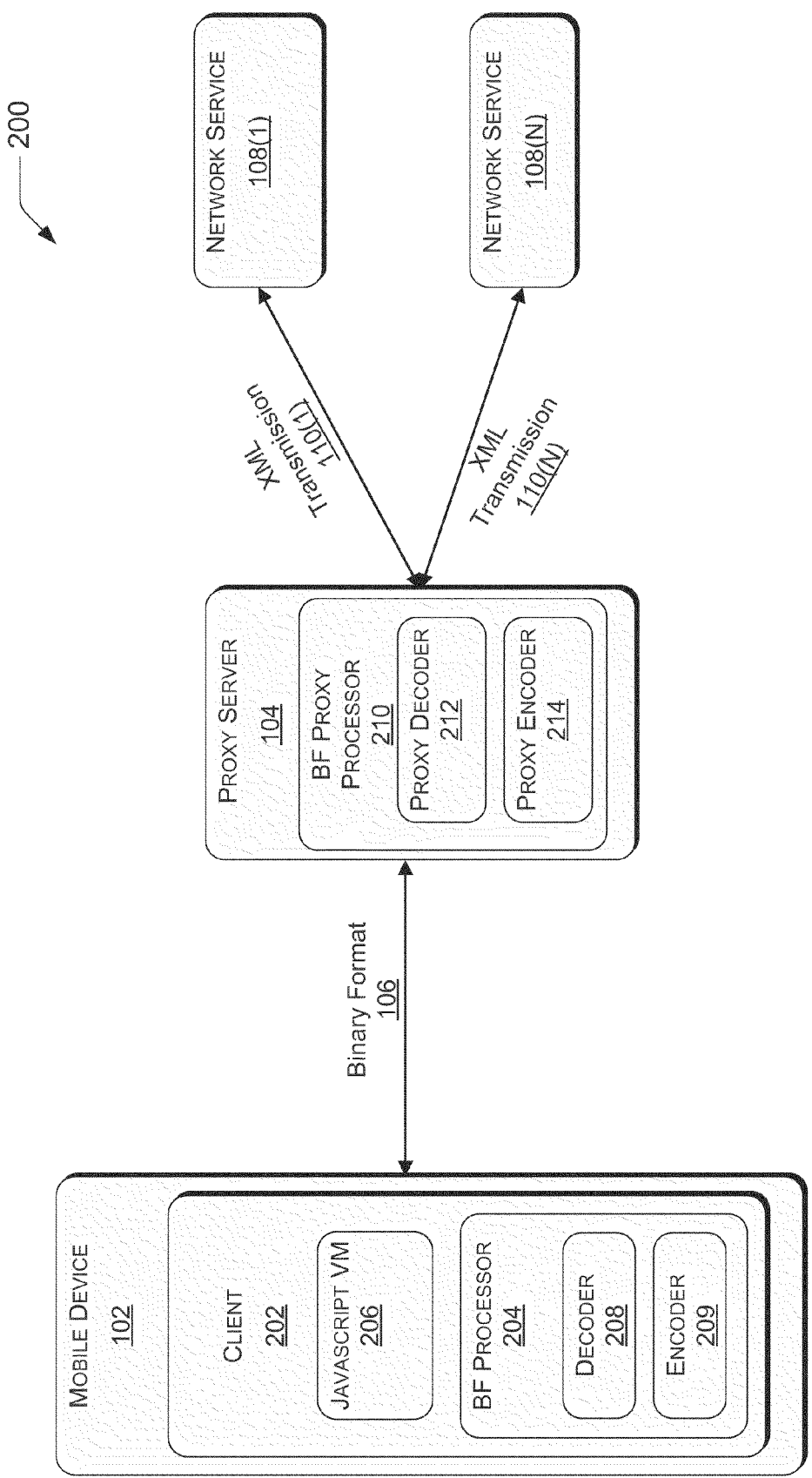
FIG. 2 is a schematic of an exemplary implementation of the architecture of FIG. 1.

FIG. 2 illustrates the environment of FIG. 1 in more detail. In one implementation a mobile device 102 may include a client 202. Client 202 running on the mobile device 102 contains a small and efficient Binary Format (BF) processor 204, Java virtual machine 206, a decoder 208 and an encoder 209. In one implementation, the BF processor 204 is written in a java language. However, in other implementations, the BF processor may be written in any suitable language. Binary Format processor 204 enables efficient translation of code through decoder 208 and encoder 209, providing the user a faster and more efficient experience when communicating BF 106 to the desired network service. As used in this application, code may include, without limitation, machine language instructions, assembly language instructions, high level language instructions, source code, compiled executable code, or other information specifying execution parameters of a microprocessor. Decoder 208 and encoder 209 may be updated at any time or in response to a predetermined time period to ensure that BF processor 204 operates in the most efficient manner.

As illustrated in FIG. 2, the proxy server 104 may contain a Binary Format (BF) proxy processor 210, proxy decoder 212, and a proxy encoder 214. In one implementation, BF proxy processor 210 is written in a C# language. However, in other implementation, the BF proxy processor 210 may be written in any suitable language. Proxy server 104 receives and converts BF 106 sent from the mobile device to XML transmission 110(1)-110(N). The XML transmission may then be sent to network services 108(1)-108(N). In one implementation, the proxy server 104 may convert the XML transmission 110(1)-101(N) sent from the network service to BF 106. In another implementation, a data normalizer component may be employed to receive and convert a transmission sent from network services 108(1)-108(N) into BF 106. The data normalizer component may comprise an adapter such as an Extensible Stylesheet Language Transformation (XSLT) for conversion of an XML document into another XML document, an adapter for a JavaScript Object Notation, or the like. Accordingly, the data normalize component may convert a transmission sent from various resources, in various formats, into BF 106.

Data sent from the mobile device 102 to and from network services 108(1)-108(N), may undergo at least two conversions. In one implementation, this conversion process involves a first conversion converting from a first language, such as JavaScript, to a binary format, and a second conversion converting the binary format converted to a second language, XML. In other implementations, the conversion process may involve any suitable language and/or format.

Figure 3:
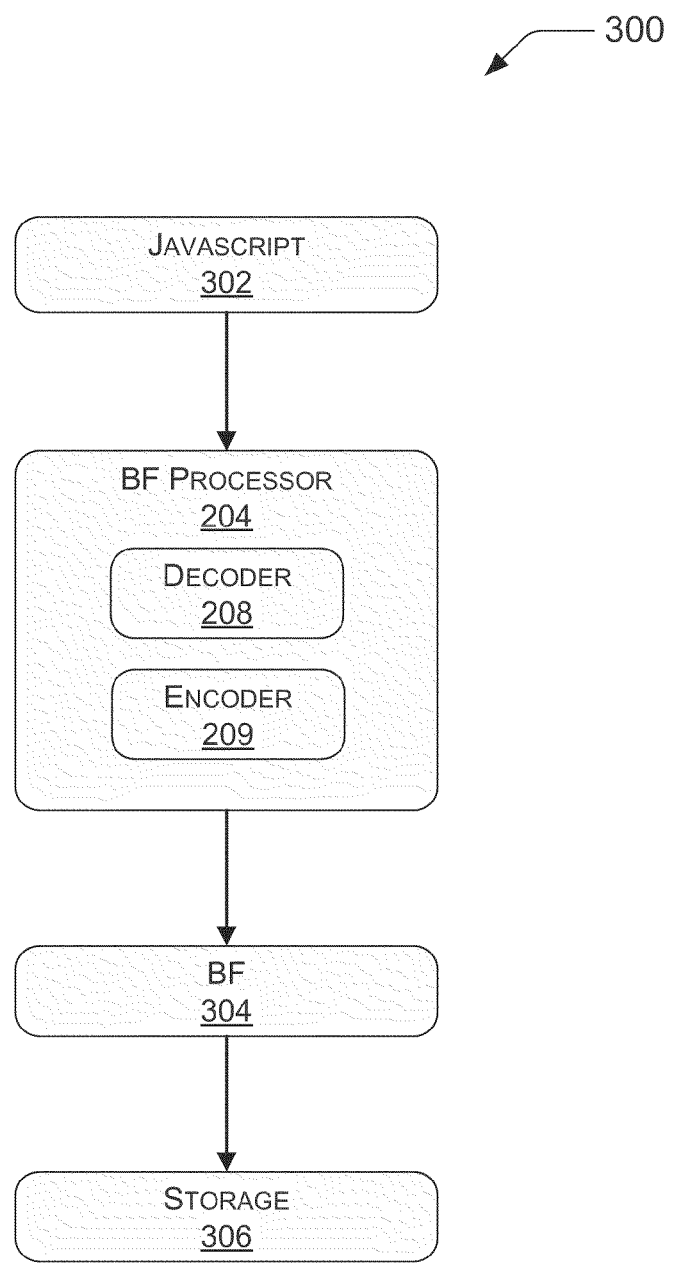
FIG. 3 is an illustrative process flow for converting data to a binary format and saving the binary format to the mobile device.

In another implementation, as illustrated in FIG. 3, binary format processor 204 may be used to convert a file created in a scripting language, such as a Javascript 302, to a binary format file 304. The binary format file 304 may then be saved in storage 306 located on the mobile device 102. Storage 306 may also comprise an external storage device such as, without limitation, a flash drive, a CD-ROM, and the like. Alternatively, binary format processor 204 may be used in a read-only capacity. When used in this format, binary format processor 204 may load a binary format file 304 saved in storage 306.

The structure of the binary format (BF 106) preserves the structure of the data sent to and from the network service 108(1)-108(N). For example, the network services 108(1)-108(N) characteristically use the second language XML. The XML data structure must be preserved in order to ensure an accurate transmission from the mobile device 102 to the network services 108(1)-108(N) and back. Utilizing BF 106, the XML data structure is read and converted to the Binary Format such that the structure is maintained.

Figure 4:
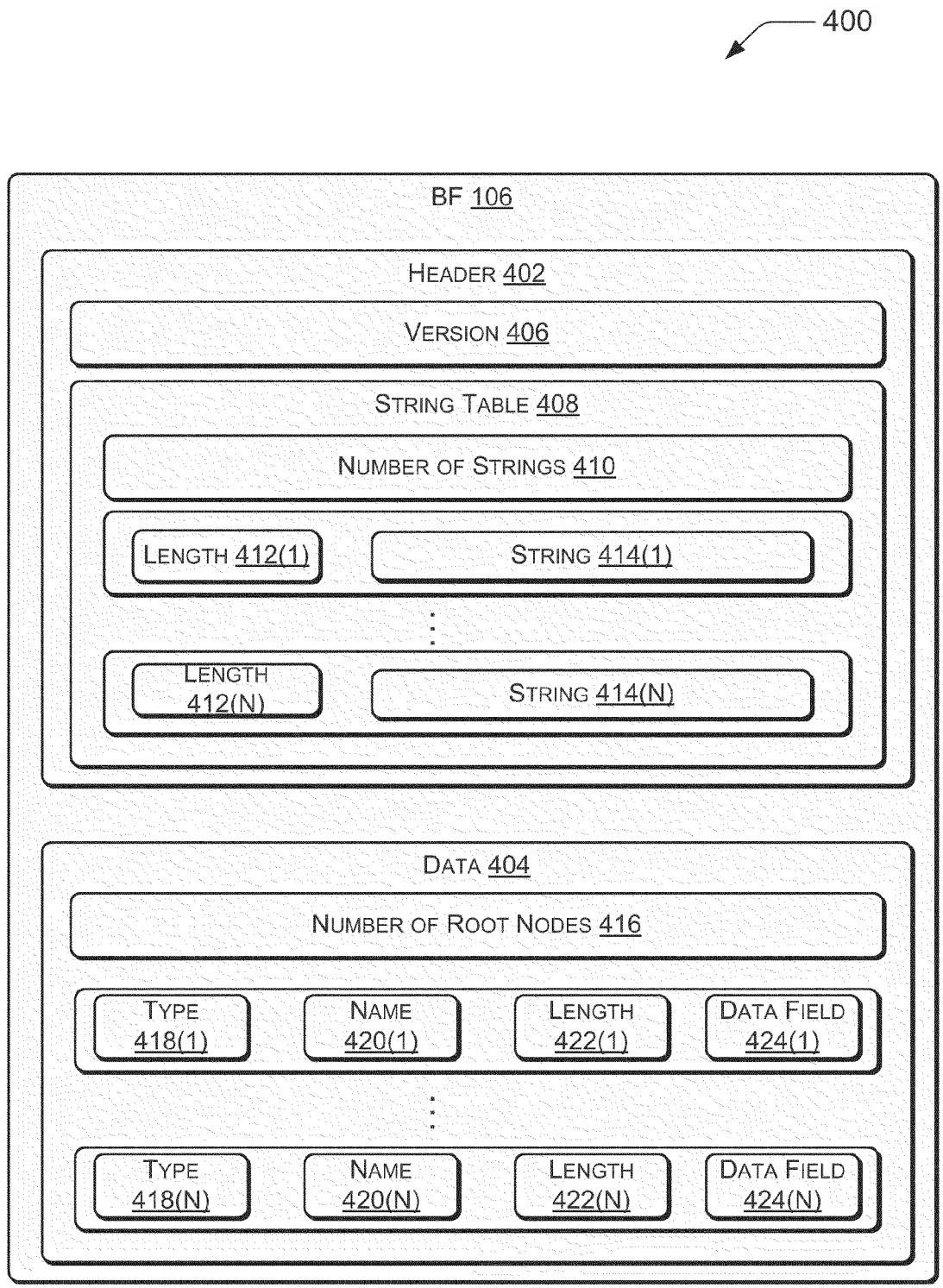
FIG. 4 is a schematic of an illustrative Binary Format.

As illustrated in FIG. 4, BF 106 may consist of two components, header 402 and data (or payload) 404. However, in other implementations, BF 106 may contain any number of components. The structure of BF 106 provides an efficient mode of translation between the language sent to/from the mobile device 102 as well as to/from the network services 108(1)-108(N). For example, the KBF nodes of the Binary Format listed in Table 1 shown below may be mapped directly to an object found in the Javascript language of the mobile device 102. That is, each type tag listed in Table 1 has a corresponding type in the Javascript language. Therefore, translation between the Javascript language and the Binary Format 106 is trivial and consumes very little processing time on the mobile device 102.

In one implementation, a header 402 comprises version 406, string table 408, number of strings 410, length 412(1)-412(N), and string 414(1)-414(N). In other implementations, header 402 may contain additional components. Version 406 may consist of any means of identification, typically an integer, identifying the binary format version used during the conversion process.

String table 408 enables direct mapping when sending the communication to/from the network services 108(1)-108(N). For example, data generated by a network service 108 may be written in XML. Each time a string is read from an XML transmission, the string is saved to string table 408. The various XML nodes, contained in strings 414(1)-414(N), may then be mapped to the corresponding BF node, the name of the BF node being referenced in the string table 408. In another implementation, string table 408 may include a reference to a well-known string table, further optimizing bandwidth and memory throughout the transmission.

In one implementation, data 404 comprises number of root nodes field 416, type field 418(1)-418(N), name field 420(1)-420(N), length field 422(1)-422(N), and data field 424(1)-424(N). Table 1 is an illustrative example of values that may be found in data 404.

TABLE 1

| Type Tag | Description | Length Field | Data Field | Composite Yes/No |
|---|---|---|---|---|
| 1 | 8-bit signed number | Omitted | 1-byte | No |
| 2 | 8-bit unsigned number | Omitted | 1-byte | No |
| 3 | 16-bit signed number | Omitted | 2-bytes | No |
| 4 | 16-bit unsigned number | Omitted | 2-bytes | No |

TABLE 1-continued

| Type Tag | Description | Length Field | Data Field | Composite Yes/No |
|---|---|---|---|---|
| 5 | 32-bit signed number | Omitted | 4-bytes | No |
| 6 | Boolean True | Omitted | Omitted | No |
| 7 | Boolean False | Omitted | Omitted | No |
| 8 | Null | Omitted | Omitted | No |
| 9 | Undefined | Omitted | Omitted | No |
| 10 | Inline String | Number of bytes | Chars of the string | No |
| 11 | Reference to string in string table | Omitted | Index in string table | No |
| 12 | Regular expression | Number of bytes | t.ba. | No |
| 13 | JavaScript compiled applet | Number of bytes | Bytes of the applet | No |
| 14 | Object | Number of elements | Sequence of KBF nodes | Yes |
| 15 | Array | Number of elements | Sequence of KBF nodes | Yes |
| 16 | Vector | Number of elements | Sequence of KBF nodes (without names) | Yes |
| 17 | Date | Omitted | 4-bytes | No |
| 18 | Image (PNG format) | Number of bytes | Bytes of the image | No |
| 19 | Header TTL | Omitted | 4-bytes | No |
| 20 | Tag (AKA entity tag) | Number of bytes | Chars of the string | No |
| 21 | Priority | Omitted | 1-byte | No |
| 22+ | Reserved for future use | | | |

In another implementation, the name field 420(1)-420(N), the length field 422(1)-422(N), and the data field 424(1)-424(N) may be omitted. Binary Format 106 may be sent with only the type field. Upon reading the BF format, the proxy decoder 212 may infer from the type field 418(1)-418(N) the corresponding name 420, length 422 and data field 424. This enhances the efficiency of the translation of the data transmission as it moves through system 100.

In yet another implementation, the name field 420 may be replaced by a placeholder or representative ID tag. This placeholder preserves the ability to reference the name throughout the conversion process to and from the mobile device 102.

Exemplary Method

Figure 5:
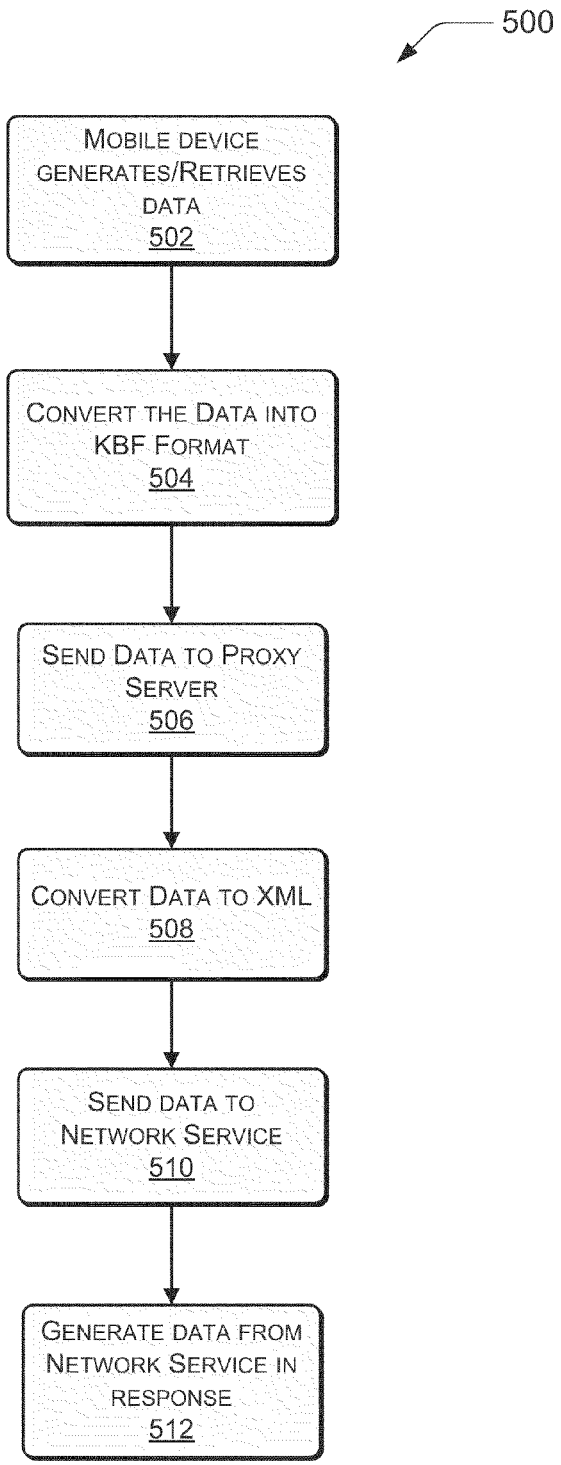
FIG. 5 is an illustrative process flow diagram for sending data from a mobile device through a proxy server to a network service.

FIG. 5 illustrates an exemplary method 500 for sending data from a mobile device 102 to network services 108(1)-108(N). The process 500 begins by generating or retrieving data from the mobile device 102 as represented in block 502. The client 202 on the mobile device 102 may store and retrieve data in a local storage available on the mobile device 102. This enables the data received from the proxy server 104 to be cached and the user's settings and information remain with the data for future use. After retrieving or generating data 502, the data is converted from a Javascript language to a binary format language 504. For example, each and every time the client 202 sends to or receives data from a network services 108(1)-108(N) a binary format processor 204 is triggered in the mobile device 102 to perform a conversion.

In block 506, the data is sent in the binary format language to a proxy server 104. The proxy server 104 receives the data and converts the data in from the binary language to an Extensible Markup Language (XML) 508. In one implementation, the proxy server performs the conversion in a single pass. However, in other implementations, the proxy server may perform the conversion in one or more passes. The data is sent in the XML format to the desired network service in block 510. The network service receives the data and generates data in response in block 512.

Figure 6:
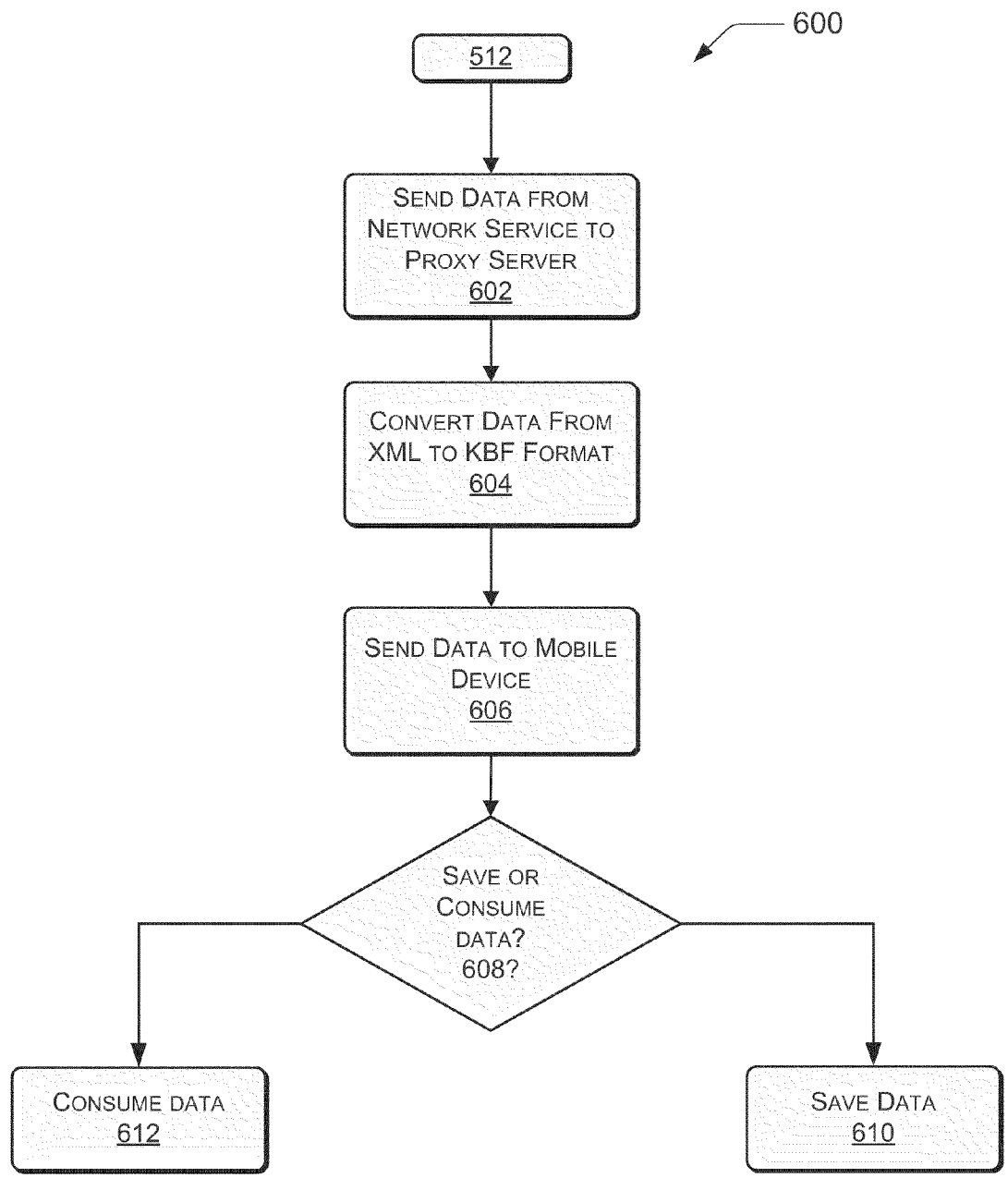
FIG. 6 is an illustrative process flow for a network service sending data to the mobile device through a proxy server.
Figure 7:
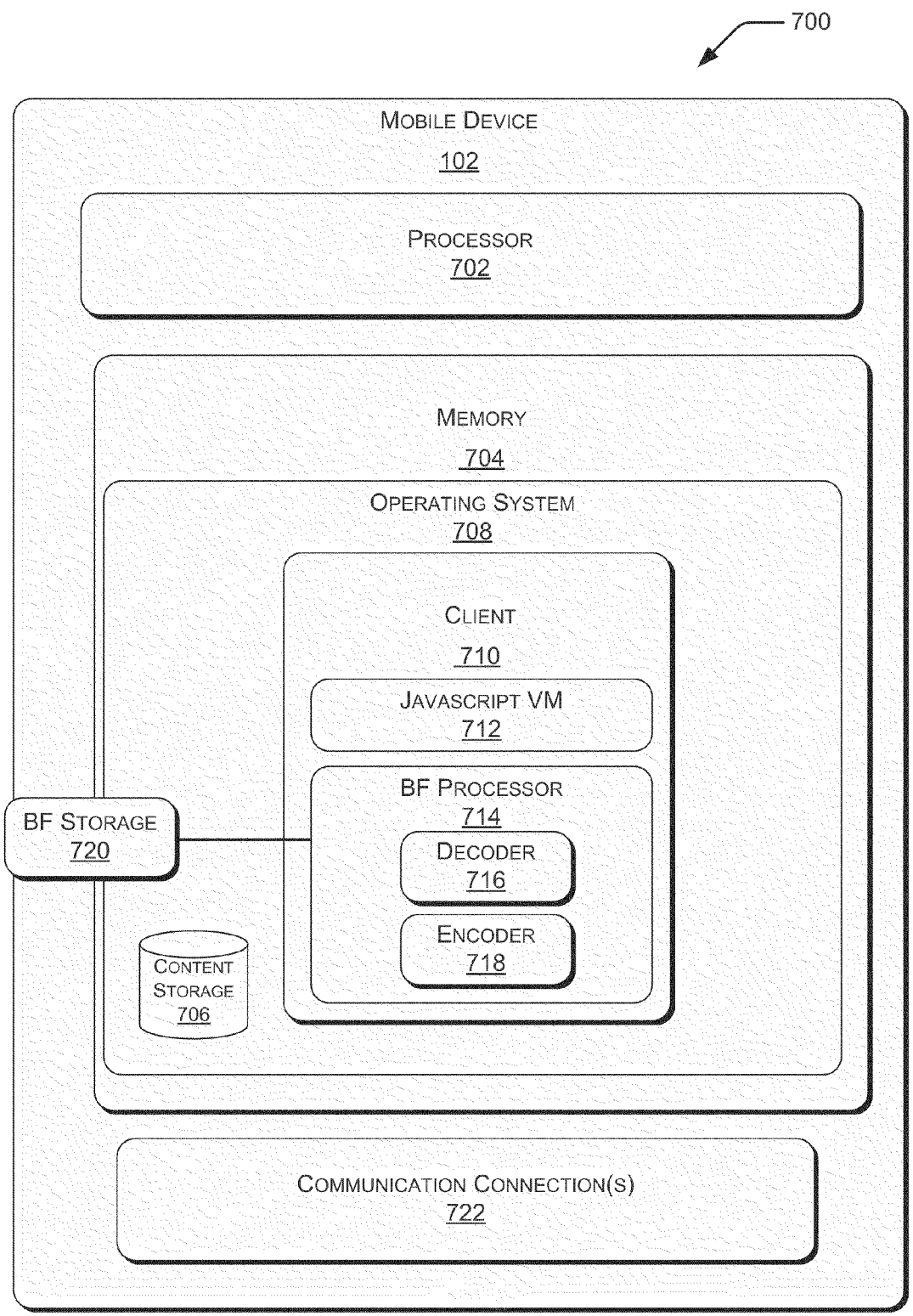
FIG. 7 is an illustrative block diagram for an exemplary mobile device according to FIG. 1.

FIG. 6 illustrates an exemplary method 600 for sending data from the network services 108(1)-108(N) to the mobile device 102. In block 602, the network services sends the data generated in block 512 to the proxy server 104. Alternatively, data may be sent to the proxy server that was not the result of a prior communication from the device to the network. After receiving the data, the proxy server 104 converts the data from an XML format to a binary format in block 604. In one implementation, the proxy server 104 may convert the data in a single pass. However, in other implementations, proxy server 104 may convert the data in one or more passes. In block 606, the data is sent in the binary format 106 to the mobile device 102. Upon receipt of the data in block 608, the mobile device may choose to consume the data or save the data. In one implementation, the mobile device may choose to both save and consume the data. If the mobile device chooses to save the data, in block 610 the binary format processor on the mobile device 102 writes the data into the local storage. If the mobile device 102 chooses to consume the data, in block 612 the binary format processor 204 on the mobile device 102 converts the binary format language to a Javascript.

Exemplary Mobile Device

Mobile device 102 may be configured as any suitable device capable of accessing web applications. In one exemplary configuration 700, the mobile device comprises at least one general processor 702. The processing unit may be implemented as appropriate in hardware, software, firmware, or combinations thereof. Software or firmware implementations of the processing unit may include computer- or machine-executable instructions. In other implementations, other applications may be used.

Memory 704 may store programs of instructions that are loadable and executable on the processor, as well as data generated during the execution of these programs. Depending on the configuration and type of device, memory may be volatile (such as RAM) and/or non-volatile (such as ROM, flash memory, etc.). The device may also include additional removable storage 706 and/or non-removable storage including, but not limited to, magnetic storage, optical disks, and/or tape storage. The disk drives and their associated computer-readable medium may provide non-volatile storage of computer readable instructions, data structures, program modules, and other data for the communication devices.

Memory, removable storage, and non-removable storage are all examples of computer storage medium. Additional types of computer storage medium that may be present include, but are not limited to, RAM, ROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the mobile device.

Turning to the contents of the memory 704 in more detail, the memory may include an operating system 708 with a client 710. Furthermore, two or more illustrated components may combine to form a single component at a single location.

In one implementation, the client 710 includes a Javascript virtual machine 712, a Binary Format (BF) processor 714, a decoder 716, and encoder 718. BF processor 714 may be coupled to a local storage 720. In other implementations, client 710 may include a second processor.

The mobile device 102 also contains communications connection(s) 722 that allow the processor to communicate with the proxy server 104 and network service(s) 108(1)-108(N). Communications connection(s) is an example of communication medium. Communication medium typically embodies computer-readable instructions, data structures, and program modules. By way of example, and not limitation, communication medium includes wired media such as a wired network or direct-wired network connection, and wireless media such as acoustic, RF, infrared and other wireless media. The term computer readable medium as used herein includes both storage medium and communication medium.

The mobile device 102 may also include input device(s) such as a keyboard, a mouse, pen, voice input device, touch input device, etc., and output devices such as a display, speakers, etc.

Exemplary Proxy Server

Figure 8:
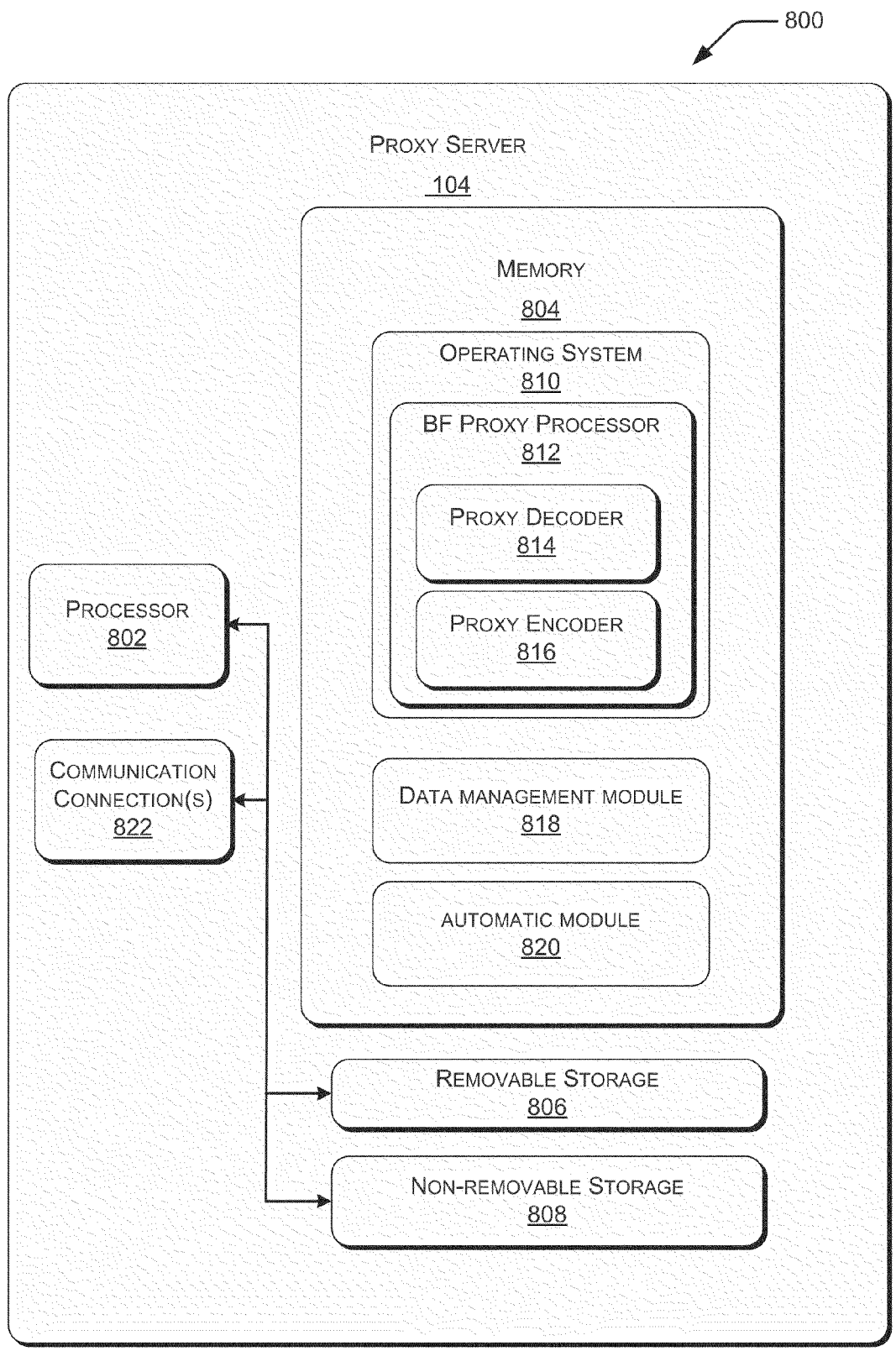
FIG. 8 is an illustrative block diagram for an exemplary proxy server according to FIG. 1.

FIG. 8 is a schematic block diagram 800 of an exemplary proxy server 104. In one exemplary configuration, the proxy server comprises at least one general processor 802 and a memory 804. The processing unit 802 may be implemented as appropriate in hardware, software, firmware, or combinations thereof. Software or firmware implementations of the processing unit 802 may include computer- or machine executable instructions written in any suitable programming language to perform the various functions described.

Memory 804 may store programs of instructions that are loadable and executable on the processor 802, as well as data generated during the execution of these programs. Depending on the configuration and type of proxy server, memory 804 may be volatile (such as RAM) and/or non-volatile (such as ROM, flash memory, etc.). The proxy server 104 may also include additional removable storage 806 and/or non-removable storage 808 including, but not limited to, magnetic storage, optical disks, and/or tape storage. The disk drives and their associated computer-readable medium may provide non-volatile storage of computer readable instructions, data structures, program modules, and other data for the communications devices.

Memory 804, removable storage 806, and non-removable storage 808 are all examples of the computer storage medium Additional types of computer storage medium that may be present include, but are not limited to, RAM, ROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by proxy server 104.

In one implementation, these components reside on one proxy server 104. Alternatively, these components may reside in multiple servers.

Turning to the contents of the memory 804 in more detail, the memory may include an operating system 810, Binary Format (BF) proxy processor 812, proxy decoder 814, and proxy encoder 816. Furthermore, these illustrated components may combine to form a single component at a single location In one implementation, the memory 804 includes a data management module 818 and an automatic module 820. The data management module 818 stores and manages storage of information, such as images, ROI, equations, and the like, and may communicate with one or more local and/or remote databases or services. The automatic module 820 allows the process to operate without human intervention.

The proxy server 104 may also contain communications connection(s) 822 that allow processor 802 to communicate with other services. Communications connection(s) 822 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media.

Exemplary User Interfaces

Figure 9:
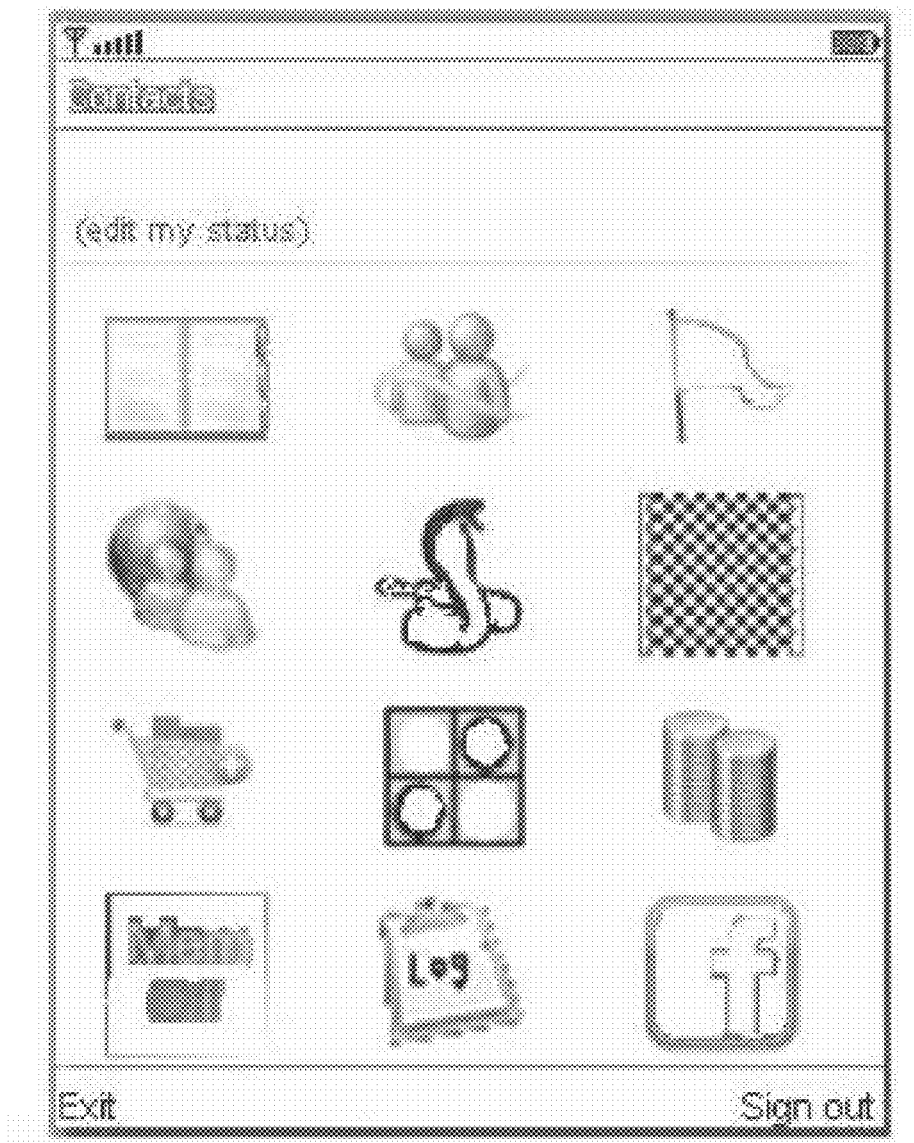
FIGS. 9-11 illustrate exemplary user interfaces for applications utilizing the architecture according to FIG. 1.
Figure 10:
Figure 11:
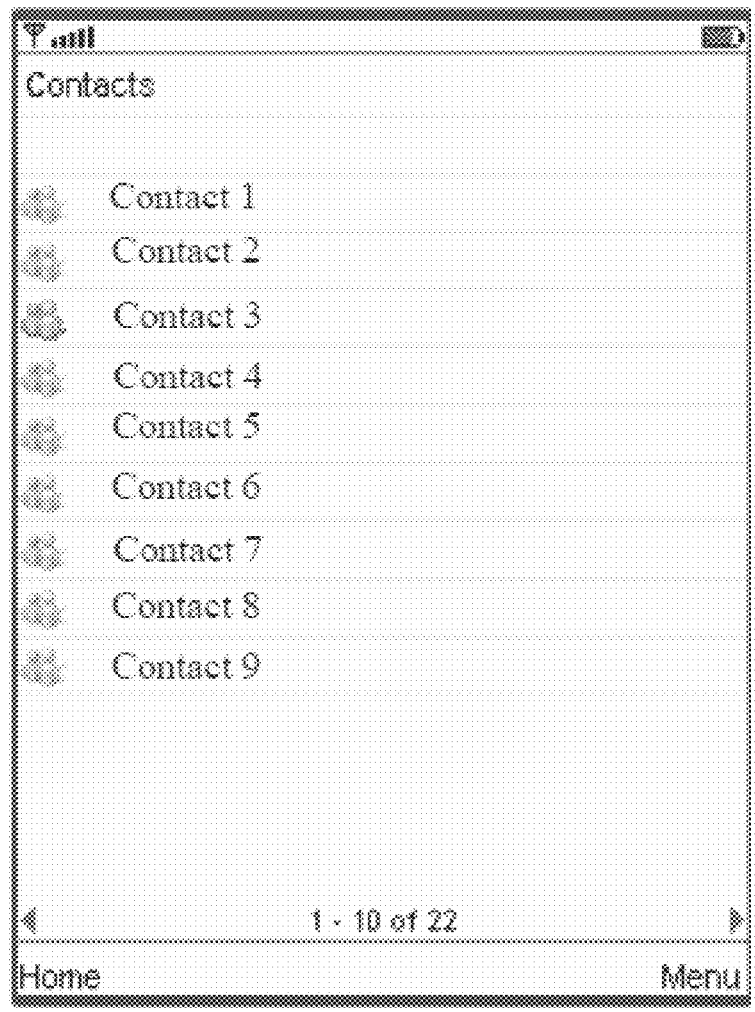

FIGS. 9 to 11 illustrate exemplary user interfaces. The figures each provide a user interface usable to access and to utilize those systems and methods described above. FIG. 9 illustrates an exemplary user interface menu for use with the system and methods described above. FIG. 10 illustrates an exemplary user interface usable to access an application to sign in. FIG. 11 illustrates an exemplary user interface usable to access a contact list that may be used with the methods and systems described above.

CONCLUSION

Although embodiments for data conversion on a proxy server in a mobile device environment have been described in language specific to structural features and/or methods, it is to be understood that the subject of the appended claims are not necessarily limited to the specific features or methods described. Rather, the specific features and methods are disclosed as exemplary implementations.

What is claimed is:

1. A computer-implemented method comprising:
under control of one or more computing systems configured with executable instructions,
receiving an inbound data in a first language at a proxy server from a mobile device, the first language comprising a binary format language that comprises a header section and a data section that comprises a plurality of root nodes and a type, the inbound data being generated by mapping one or more elements of a scripting language to the plurality of root nodes of the data section of the binary format language;
performing a first conversion at the proxy server, the first conversion transforming the inbound data from the first language to a second language;
sending the inbound data from the proxy server to a network service that generates an outbound data in response;
performing a second conversion at the proxy server, the second conversion transforming the outbound data to the first language while maintaining a structure of the outbound data; and
sending the outbound data to the mobile device.

2. The method of claim 1, wherein the header section comprises at least one of a version, a string table, and a number of strings.

3. The method of claim 1, wherein the data section further comprises at least one of a name, a length, and a data.

4. The method of claim 1, wherein the second language comprises an Extensible Markup Language (XML).

5. The method of claim 1, wherein the first conversion and the second conversion comprise a single pass on the proxy server.

6. A memory device encoded with instructions that, when executed by a processor of a proxy server, perform acts comprising:
receiving an inbound data in a first language at the proxy server from a mobile device, the first language comprising a binary format language that comprises a header section and a data section that comprises a plurality of root nodes and a type, the inbound data being generated by mapping one or more elements of a scripting language to the plurality of root nodes of the data section of the binary format language;

performing a first conversion at the proxy server, the first conversion transforming the inbound data from the first language to a second language;

sending the inbound data from the proxy server to a network service that generates an outbound data in response;

performing a second conversion at the proxy server, the second conversion transforming the outbound data to the first language while maintaining a structure of the outbound data; and sending the outbound data to the mobile device.

7. The memory device computer of claim 6, wherein the acts further comprise receiving updates to the processor of the proxy server on a predetermined time period.

8. The memory device of claim 6, wherein the acts further comprise comprising:

receiving at the proxy server other data from the network service;

converting the other data to the binary format; and sending the other data to the mobile device.

9. The memory device of claim 6, wherein the second language comprises an Extensible Markup Language (XML).

* * * * *